Figure 1:
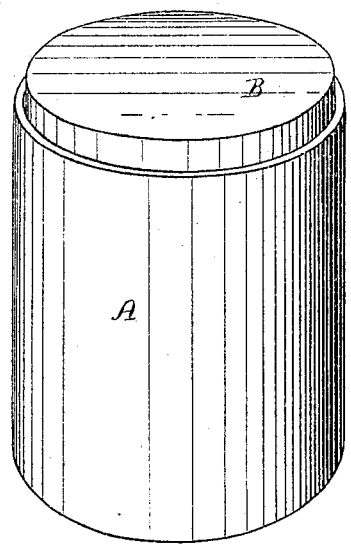

A. H. KING.

Improvement in Rubber Car Spring.

No. 132,765. Patented Nov. 5, 1872.

Witnesses.
Phil. F. Larner
Geo. F. Steny

Inventor.
Albert H. King
By M. Wood
Attorney

UNITED STATES PATENT OFFICE.

ALBERT H. KING, OF RAHWAY, NEW JERSEY.

IMPROVEMENT IN RUBBER CAR-SPRINGS.

Specification forming part of Letters Patent No. 132,765, dated November 5, 1872.

*To all whom it may concern:*

Be it known that I, ALBERT H. KING, of Rahway, in the county of Union and State of New Jersey, have invented a certain new and useful Rubber Car-Spring, of which the following is a specification:

My invention consists in combining within a case, in one or more vertical series, three or more cylindrical masses of elastic vulcanized rubber or caoutchouc, placed side by side, and practically filling the case horizontally, so that each of the exterior rubber cylinders will be in contact with the side of the case, and also in contact with the vertical surface of one or more adjacent cylinders, while each of the interior cylinders, when such are employed, will be in contact with those next adjacent, and thus, by presenting a lateral series of vertical spring surfaces in contact with each other and providing suitable intervening open spaces, a material saving of elastic material is effected without detracting from the reactive force of the spring or affecting its general utility; and I do hereby declare that the following specification, taken in connection with the drawing furnished and forming a part of the same, is a clear, true, and exact description of a car-spring involving my improvement.

Figure 2:
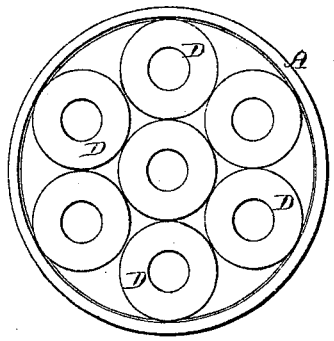
Figure 3:
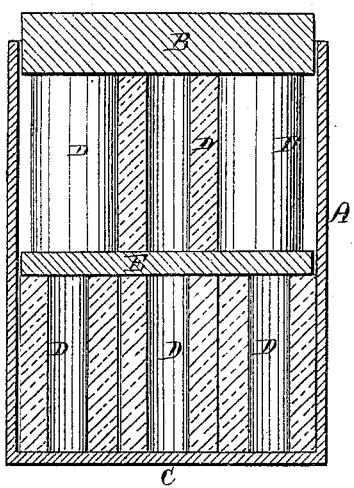
Figure 4:
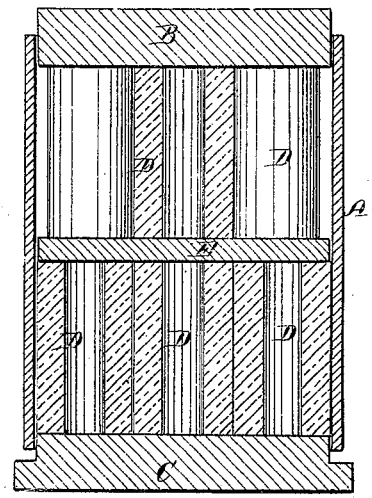

Figure 1 represents one of my car-springs in perspective; Fig. 2 represents the same in top view with crown-plate removed; Fig. 3 represents the same in cross-vertical section; and Fig. 4 represents the same with a movable base-plate.

A denotes the case, within which the cylindrical masses of rubber are placed. B denotes the crown-plate, and C the base-plate. The latter may be made stationary or capable of an independent vertical movement within the case, as shown in Fig. 4. D denotes in each case a cylindrical mass of elastic vulcanized rubber or caoutchouc. They are square at top and bottom, and may be made with or without a longitudinal axial opening, as may be desired. For heavy service the solid cylinder will be preferable, while for light burdens the tubular structure may be profitably employed. As exhibited in the drawing, the cylindrical masses are placed in two series, each consisting of six exterior cylinders surrounding a seventh or central one. The two series are separated by a horizontal separating-plate, E. It will be observed that there are four intervening open semi-triangular spaces into which every exterior cylinder is free to expand, and six intervening open spaces into which the central cylinder is also free to expand. It will also be readily observable that, while each exterior cylinder is in contact at one point of its periphery with an unyielding surface presented by the case, it is also in contact at three other points with yielding spring surfaces as presented by the next adjacent cylindrical masses of rubber, and that the central cylinders are in contact with none but yielding spring surfaces, except at top and bottom, where they are in contact with the base, crown, or separating plates.

I am aware that single cylindrical masses of rubber have been employed with and without inclosing-cases and in a great many different combinations; also, that a number of columns of rubber have been employed within a case surrounding a central spiral metal spring. In such springs, however, the columns were confined between vertical unyielding metallic surfaces, and were not generally in contact therewith, except when compressed by a load nearly equal to their carrying capacity. In springs of the character last described the cylindrical masses of rubber are in contact with metallic surfaces on two sides, and can exercise a lateral or radial force only so far as these two metallic surfaces will permit, while in the applicant's spring there is a unity of spring action which extends radially or laterally entirely across the case in all directions, not only in a concentric line, but in radial or lateral lines. I am also aware that single cylindrical masses of rubber, solid and also of a tubular structure, have been employed in combination with an exterior surrounding spiral spring.

By having the cylinders in contact with each other, as herein described, the several cylinders compose, in operation and effect, one mass of live rubber, and, therefore, the entire spring force of the rubber is utilized, and consequent economy is attained in the manufacture of such springs.

Having thus described my invention, I claim as new and desire to secure by Letters Patent—

1. The improved car-spring, composed of three or more vertical cylindrical masses of elastic vulcanized rubber or caoutchouc combined within an inclosing-case and arranged, substantially as described, side by side therein, in such a manner that the contact of one or more of the unyielding sides of the case with any one of the cylinders will be offset or balanced by direct contact of the opposite side or sides of the same cylinder with the elastic yielding spring surfaces of the rubber cylinder or cylinders next adjacent, and thus effect a radial or lateral spring connection between the several masses, the whole being interposed between base and crown plates, as and for the purposes specified.

2. The combination of two or more vertical series of elastic rubber cylinders, each series consisting of three or more cylinders, and arranged, substantially as herein described, within an inclosing-case, with the separating-plates interposed between the series and compressed between the base and crown plates, as and for the purpose specified.

ALBERT H. KING.

Witnesses:
JAMES MOONEY,
O. P. C. BILLINGS.